June 8, 1937.  W. E. CHAMBERS  2,082,872
MACHINE FOR SLICING MUSHROOMS
Filed April 7, 1936  5 Sheets-Sheet 1
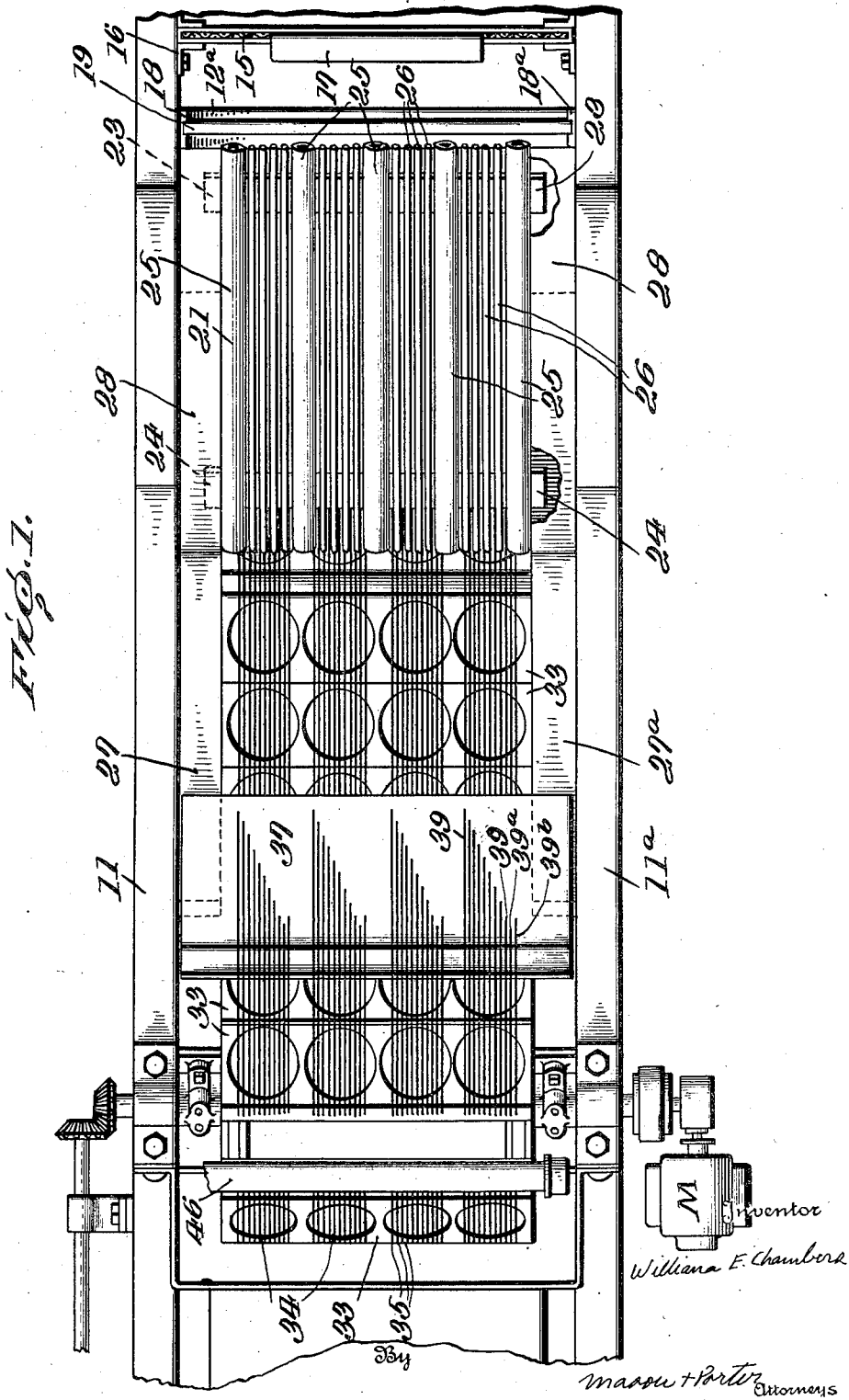

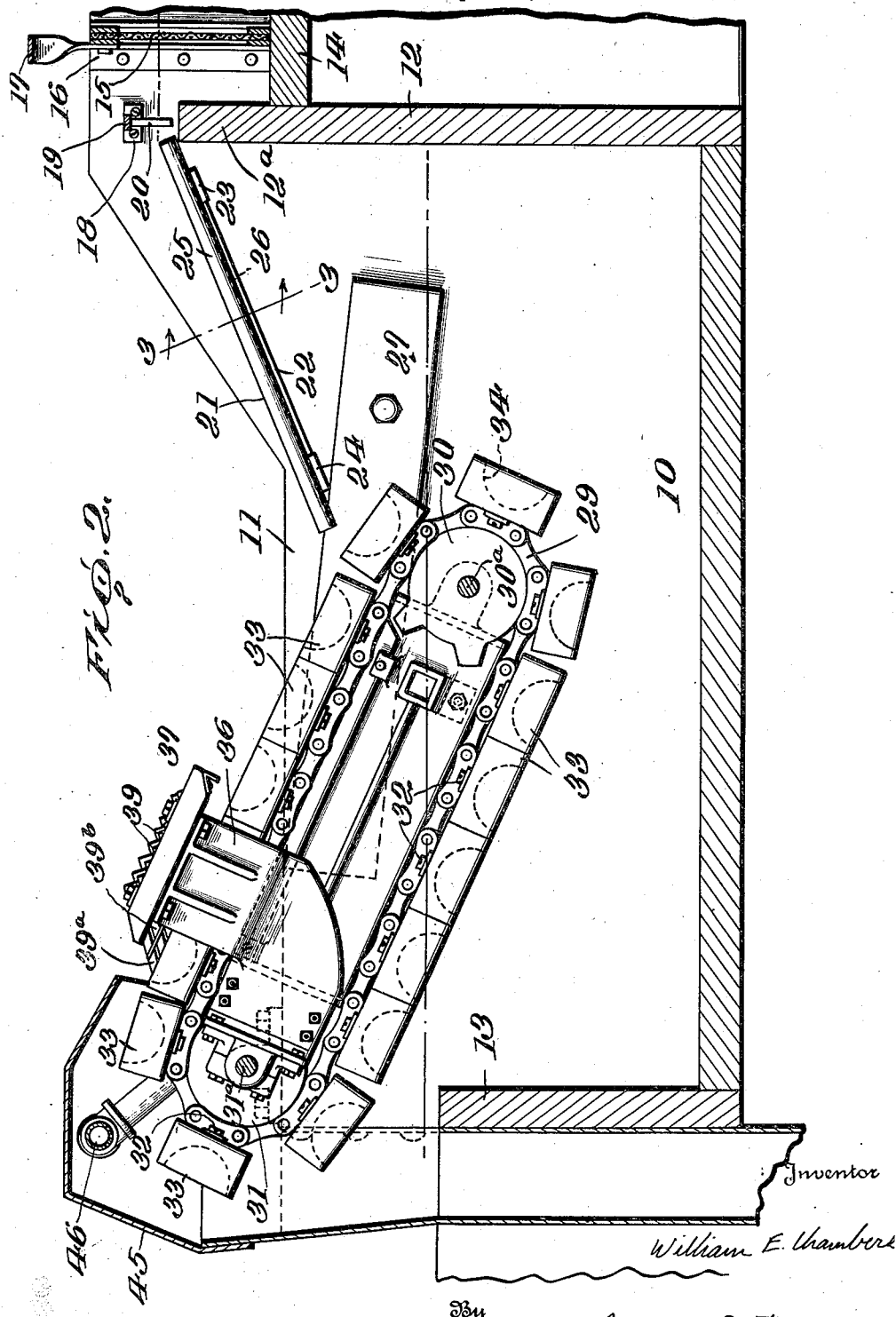

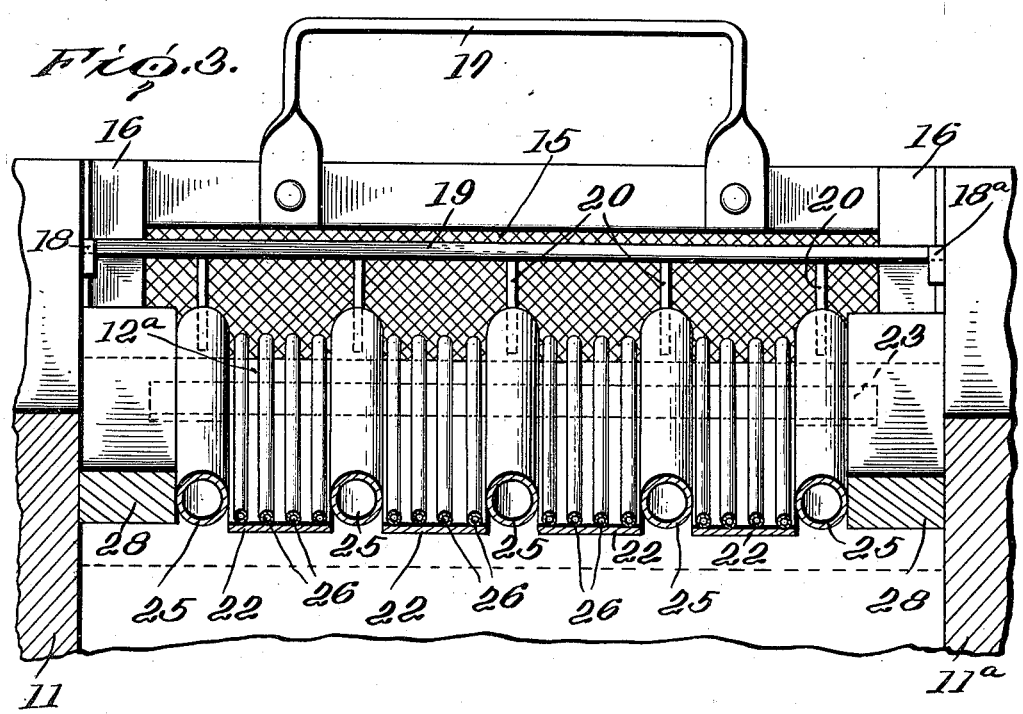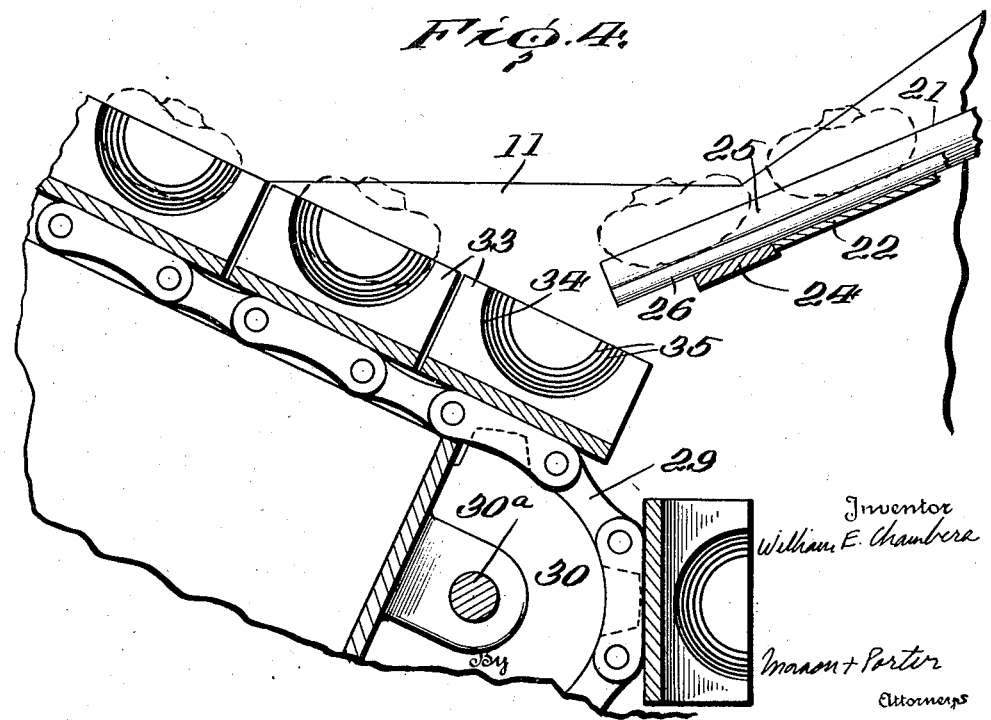

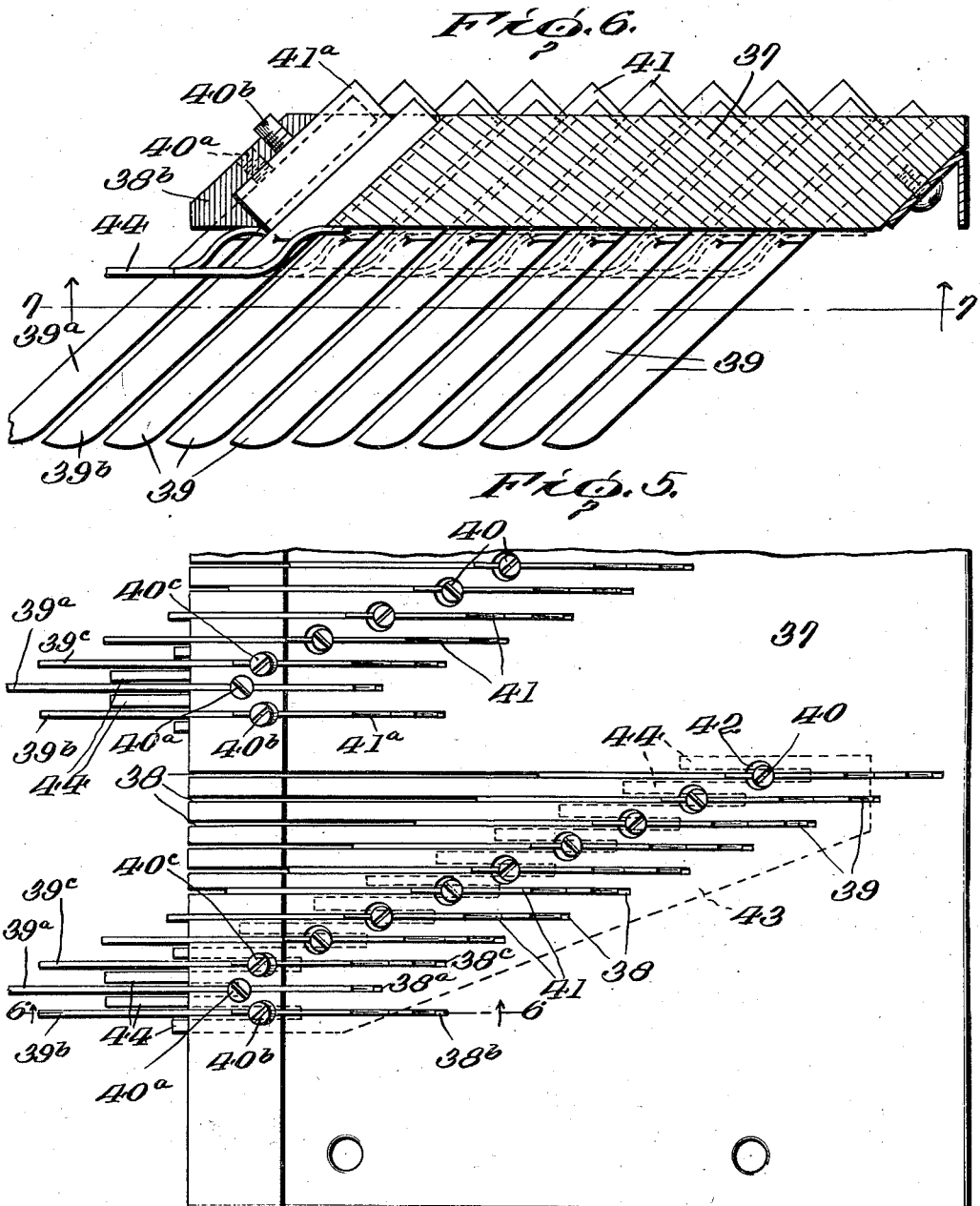

June 8, 1937.  W. E. CHAMBERS  2,082,872
MACHINE FOR SLICING MUSHROOMS
Filed April 7, 1936   5 Sheets-Sheet 5

Inventor
William E. Chambers
By Mason + Porter
Attorneys

Patented June 8, 1937

2,082,872

UNITED STATES PATENT OFFICE 2,082,872

MACHINE FOR SLICING MUSHROOMS

William E. Chambers, West Chester, Pa.

Application April 7, 1936, Serial No. 73,160

10 Claims. (Cl. 146—163)

The present invention relates to new and useful improvements in a machine for slicing mushrooms.

An object of the invention is to provide a machine of the above type wherein the mushrooms are sliced along planes which are parallel to one another and which are substantially parallel to the stem axes of the mushrooms.

A further object of the invention is to provide a machine of the above type wherein the mushrooms are individually presented to a gang of cutting knives.

A still further object of the invention is to provide a machine of the above type wherein mushrooms are properly positioned for slicing in individual conveying members which are slotted to provide ledger-blades cooperating with the cutting knives.

A still further object of the invention is to provide a machine of the above type wherein removal of the mushrooms from the conveying members during the slicing operation is prevented.

A still further object of the invention is to provide a machine of the above type wherein the mushrooms are directed by the aid of a fluid medium onto the conveying members.

The above and other objects of the invention will in part be obvious and will be hereinafter more fully described.

In the drawings,

Fig. 1 is a top plan view of the machine.

Fig. 2 is an enlarged side elevation partly in section showing the arrangement of the inclined chute, the conveyor and cutting knives.

Fig. 3 is an enlarged sectional view taken along the line 3—3 of Fig. 2 showing the several troughs on the chute for directing the mushrooms to the conveyor.

Fig. 4 is an enlarged fragmentary view, showing the relation between the troughs on the inclined chute and the individual conveyor members.

Fig. 5 is an enlarged top plan view showing the cutter head with the knives supported therein.

Fig. 6 is a sectional view taken along the line 6—6 of Fig. 5.

Figure 7:
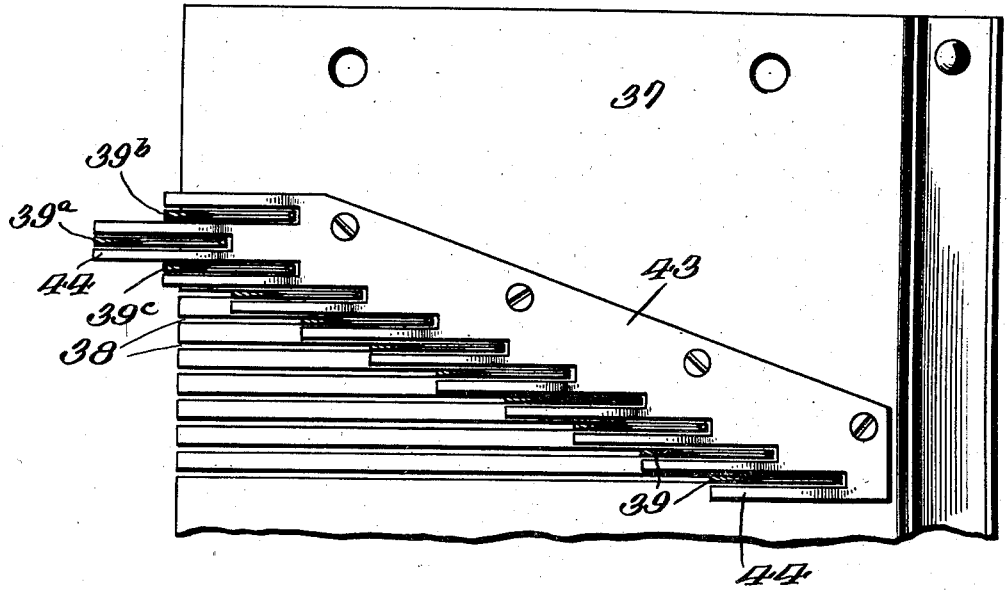
Fig. 7 is a bottom plan view of the cutter head taken along the line 7—7 of Fig. 6.

The invention consists generally in the provision of a machine for slicing mushrooms which have been graded in a grading machine, similar to the one shown in the patent to William E. Chambers, No. 1,942,238 of January 2, 1934. The mushrooms are conveyed by water from the grading machine to the slicing machine which includes a tank through which the water is constantly flowing. The mushrooms are thus wetted by the water so as to facilitate the subsequent slicing operation. The mushrooms are passed over a relatively high dam at one end of the tank onto an inclined chute which is divided into a plurality of troughs for directing individual mushrooms to individual pockets or recesses in a conveyor. The conveyor consists of a plurality of transverse bars mounted on an endless chain. Each bar constitutes a conveying member and is recessed to provide individual pockets for receiving individual mushrooms from the inclined troughs. The transverse bars are slotted through each pocket so as to provide ledger-blades cooperating with a gang of cutting knives against which the mushrooms are forcibly conveyed. The mushrooms are positioned in the individual pockets with their stem axes disposed at substantially right angles to the path of movement of the conveyor so that, as they are passed against and past the cutting knives, they will be sliced along planes which are parallel to one another and which are substantially parallel to their stem axes. After the slicing operation, the mushrooms are discharged from the conveyor into a hopper from which they are directed to another grading machine.

Referring more in detail to the accompanying drawings, and particularly to Figs. 1, 2 and 3, there is shown a tank 10 which consists of side walls 11, 11a and end walls 12 and 13. The end wall 12 is higher than the opposite end wall 13 and the top 12a of the wall 12 extends above the floor 14 which, with the side walls 11, 11a, forms a trough leading from the grading machine. A continuous stream of water flows through this trough and over the dam formed by the top portion 12a of the wall 12 and into the tank 10. A wire gate 15 is mounted for sliding movement in suitable brackets on the side walls 11, 11a, immediately in advance of the dam 12a. The gate 15 is provided with a handle portion 17 by which it may be raised and lowered. A pair of supporting brackets 18, 18a are mounted on the side walls 11, 11a respectively directly above the upper end of the dam 12a. A transverse bar 19 is carried by the brackets 18, 18a and is provided intermediate the ends thereof with a plurality of spaced fingers 20 which depend therefrom. An inclined transfer device in the form chute 21 is disposed within the tank 10 and extends downwardly from the point adjacent the top of the dam 12a to a point within and substantially at the center of the tank 10. This chute 21 consists of a plurality of spaced supporting plates 22 which are secured together by transverse bars 23, 24. Secured to the transverse bars 23, 24, is a plurality of downwardly extending pipe sections 25 which are disposed between the supporting plates 22. Secured to each of the plates 22 between the pipe sections 25, is a plurality of relatively small pipe sections 26. The upper ends of the pipe sections 25, 26 rest upon the top of the dam 12a and the lower transverse supporting bar 24 rests upon inclined supporting plates 27, 27a on the side walls of the tank 10. The fingers 20 depending from the transverse bar 19 are disposed in substantial alignment with the longitudinal axes of the larger pipe sections 25 and serve to direct the mushrooms, which are floated over the dam 12a, onto the smaller pipe sections 26. Thus, the larger pipe sections 25 provide a plurality of troughs therebetween for the downward passage of the mushrooms. Secured between the extreme end pipe sections 25 and the side walls of the tank 10 are filler blocks 28, 28a which prevent the escape of the mushrooms around the ends of the chute 21.

Figure 8:
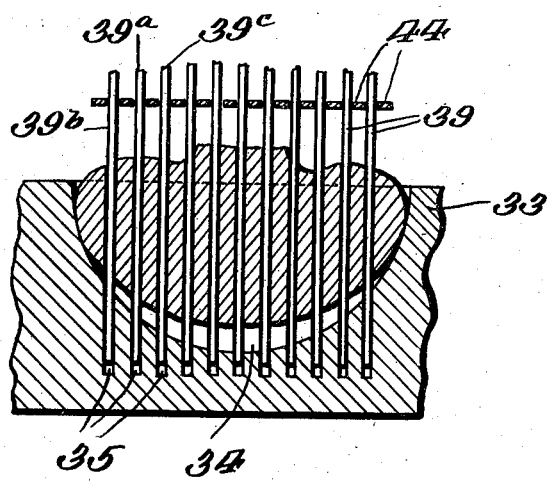
Fig. 8 is an enlarged fragmentary view in section through a portion of one of the slotted conveyor members showing the position of the cutting knives therein.

An endless conveyor chain 29, the axis of which is inclined upwardly from a point below the chute 21 to a point above the end wall 13 of the tank, is carried by pulleys 30, 31. The pulley shafts are mounted on the ends of an inclined supporting bracket 32 which is secured to the side walls of the tank. The axis of the pulley 30 is disposed below the surface of the water constantly remaining in the tank 10. The shaft 31a for the pulley 31 serves as the driving shaft for the conveyor and may be driven, according to Fig. 1, by a motor M. Carried by alternate links of the conveyor chain 29, are transverse bars 33 which extend substantially across the width of the tank. Each of the bars 33 is provided with a plurality of recesses 34 which form pockets in alignment with the inclined troughs divided between the large pipe sections 25. For purposes of illustration, there are shown four troughs and four corresponding recesses in each of the transverse bars on the conveyor. As shown in Figs. 1 and 8 of the accompanying drawings, the transverse bars are provided with a plurality of inclined slots 35 extending entirely across each of the said bars. These slots are thus disposed in the direction of travel of the conveyor and are arranged in groups, each group of slots extending through a corresponding recess in the bar.

A pair of offset bracket members 36 is mounted on opposite sides of the bracket 32. These bracket members 36 are disposed on opposite sides of the conveyor and extend above the same. A knife supporting head 37 is secured across the top of the brackets 36. The cutting knives are arranged in groups on the supporting head 37, each group including a gang of knives which are in alignment with a corresponding group of slots in the transverse conveyor bars 33. As shown in Figs. 5 and 6, the supporting head 37 is provided with groups of inclined slots 38 which are disposed in alignment with the slots 35 in the transverse bars 33. The slots are cut in from one edge of the supporting head 37 and are of different lengths, the longest slot 38 being disposed at one side of the group and each of the remaining slots down to the next to last slot 38a being of a uniformly reduced length. The last slot 38b, that is, the slot at the opposite side of the group, is of a length equal to the slot 38c which is the slot immediately preceding the shortest slot 38a. The cutting knives 39 are secured in the supporting head 37 against the inclined edges of the slots so that they extend below the supporting head and are inclined in the direction of feed of the conveyor. The knives 39, thus arranged in groups, extend into corresponding slots 35 in the transverse bars 33, as shown in Fig. 8. The knife 39a which is disposed in the shortest slot 38a is held directly by a screw 40a. In order to obviate the necessity of employing an extremely long screw for the remaining knives, the knives 39b and 39c are held by screws 40b, 40c respectively which extend through the edge of the supporting head 37 and bear upon clamping plates 41a which extend between the end of the screws 40b, 40c and the edge of the knives 39b, 39c. The remaining knives are similarly held by clamping plates 41 which are disposed between the edges of the knives and the inner ends of screws 40, which screws are threaded into the supporting head 37 through recesses 42 at the surface thereof. As shown in Figs. 6 and 7, a plate 43 is secured to the under face of the supporting head 37 directly under each group of slots therein. This plate 43 is symmetrically slotted with respect to the slots in the supporting head 37 and the metal of the plate between adjacent slots therein is offset to provide depending offset retaining fingers 44 which are adapted to prevent the mushrooms passing under the supporting head from riding up on the knives.

Housing the upper end of the conveyor above the dam formed by the end wall 13 of the tank 10 is a hopper 45 which receives the sliced mushrooms as they are discharged from the transverse conveyor bars 33. Disposed within the upper end of the hopper 45 is a transversely extending spray pipe 46 which aids in dislodging the sliced mushrooms from the individual pockets in the bars 33. Water passing through the tank 10 and over the dam 13 also is directed into the hopper 45 and serves as the conveying medium for leading the sliced mushrooms to a further grading machine.

In operation, the mushrooms are floated by water along the trough 14 from the grading machine to the wire gate 15. By raising the gate 15, the mushrooms are permitted to pass therethrough and over the dam 12a. The depending fingers 20 on the transverse bar 19 aid in directing individual mushrooms into the troughs formed between the large pipe sections 25. Part of the water flowing over the dam 12a is also directed over the chute 21 and down the troughs therein whereby to aid in conveying the mushrooms to the discharge end of the chute. The mushrooms are thus wetted during their passage along the trough 14 and down the troughs in the chute 21. This wetting of the mushrooms prior to the slicing operation is of importance in assuring clean slicing of the individual mushrooms without tearing. Mushrooms float with their stems extending either upwardly or downwardly, that is, with their stem axes substantially vertical, so that the mushrooms passing over the dam 12a will slide down the troughs in the chute 21 in the same position. As shown in Fig. 4, the mushrooms falling from the end of the chute 21 will be directed by the individual troughs into the individual pockets 34 in the transverse bars 33 in substantially the same position. The mushrooms are then carried by the conveyor under the supporting head 37 and against the cutting knives 39 which extend into the slots in the transverse bars 33. The mushrooms are thus sliced by the successive knives beginning at one side and continuing until a point adjacent the opposite side is reached. However, before the last slice is made by the knife 39a, the end knife 39b will trim off the opposite side of the mushroom. This particular arrangement of the knives 39a, 39b, 39c, so that the slicing of the mushroom by the knives 39b, 39c will commence before the last cut is made by the knife 39a, serves to prevent twisting or turning of the mushroom in its pocket before the slicing operation is completed. The offset fingers 44 beneath the supporting head 37 serve to hold the individual mushrooms in the pockets 34 during the slicing operation. Further movement of the conveyor past the cutting mechanism will discharge the sliced mushrooms into the hopper 45. The spray issuing from the pipe 46 aids in dislodging the slices from the pockets 34.

The arrangement of each gang of transversely spaced knives is such that each knife is offset rearwardly with respect to the direction of movement of the conveyor from one side of the gang to the next to last knife 39a adjacent the opposite side of the gang so that an individual mushroom is brought successively into contact with each of the knives during the slicing operation. The last knife 39b is spaced in advance of the knife 39a so that the knives at the extreme sides of each gang operate to trim the mushrooms before the final slice is effected.

It is to be clearly understood that minor changes in the details of construction and arrangement of parts may be made without departing from the scope of the invention as set forth in the appended claims.

I claim:

1. A machine for slicing mushrooms comprising a conveyor, transverse conveyor bars carried by said conveyor and having recesses therein for individually supporting the mushrooms, water flotation means for delivering the mushrooms to the recesses in the transverse conveyor bars in position for slicing, and means including a gang of transversely spaced stationary knives for slicing the mushrooms, said knives being arranged in offset relationship with respect to the direction of movement of the conveyor whereby the mushrooms are brought successively into contact with the knives during the slicing operation, and means for engaging the upper surface of the mushrooms during the slicing operation whereby to hold the mushrooms within the said recesses.

2. A machine for slicing mushrooms comprising a conveyor, transverse conveyor bars carried by said conveyor and having recesses therein for individually supporting the mushrooms, water flotation means for delivering the mushrooms to the recesses in the transverse conveyor bars in position for slicing, said conveyor bars having a group of slots extending across the same and through said recesses, and means including a gang of transversely spaced stationary knives for slicing the mushrooms, said knives extending into the slots in said conveyor bars and being arranged in offset relationship in respect to the direction of movement of the conveyor whereby the mushrooms are brought successively into contact with the knives during the slicing operation.

3. A machine for slicing mushrooms comprising a conveyor, transverse conveyor bars carried by said conveyor and having recesses therein for individually supporting the mushrooms, water flotation means for delivering the mushrooms to the recesses in the transverse conveyor bars in position for slicing, said conveyor bars having a group of slots extending across the same and through said recesses, means including a gang of transversely spaced stationary knives for slicing the mushrooms, said knives extending into the slots in said conveyor bars and being arranged in offset relationship in respect to the direction of movement of the conveyor whereby the mushrooms are brought successively into contact with the knives during the slicing operation, and means disposed between the said knives for engaging the upper surface of the mushrooms whereby to prevent their removal from the said recesses during the slicing operation.

4. A machine for slicing mushrooms comprising a tank through which water constantly flows, an endless conveyor extending from a point within said tank to a point above the water level therein, a plurality of transverse conveyor bars mounted on said conveyor, each of said bars having recesses therein and a group of slots passing through each of said recesses, a dam at one end of said tank over which the mushrooms are floated, means for delivering individual mushrooms passing over said dam to said recesses, and a gang of transversely spaced stationary knives for slicing the mushrooms, said knives being arranged in offset relationship with respect to the direction of movement of the conveyor whereby the mushrooms are brought successively into contact with the knives during the slicing operation.

5. A machine for slicing mushrooms comprising a conveyor, means for individually supporting mushrooms on said conveyor, water flotation means for delivering the mushrooms to the supporting means in position for slicing, and means including a gang of transversely spaced stationary knives for slicing the mushrooms, said knives being offset rearwardly with respect to the direction of movement of the conveyor from one side of the gang to a point adjacent the opposite side thereof, the knife at the said opposite side of the gang being located slightly in advance of the last rearwardly offset knife whereby to trim the final edge of the mushrooms before effecting the final slice.

6. A machine for slicing mushrooms comprising a conveyor, a plurality of transverse conveyor bars carried by said conveyor, each of said bars having recesses therein and a group of slots passing through each of said recesses, water flotation means for delivering the mushrooms to the recesses in the transverse conveyor bars in position for slicing, and groups of knives supported in gang formation above said conveyor and extending into the slots in said conveyor bars whereby to slice the individual mushrooms as they are passed thereunder.

7. A machine for slicing mushrooms comprising a tank through which water constantly flows, a dam at one end of said tank over which the mushrooms are floated, an inclined chute leading downwardly from said dam to a point within said tank, said chute having formed thereon a plurality of troughs for directing individual mushrooms, an inclined conveyor having one end disposed below the discharge end of said chute and having the opposite end disposed above the surface of water in said tank, a plurality of transverse conveyor bars carried by said conveyor, each of said bars having recesses similarly spaced with respect to the troughs on said chute whereby to receive individual mushrooms falling therefrom, said bars having a plurality of slots therethrough, said slots being arranged in groups and passing through the recesses in the said bars, and groups of knives supporting in gang formation above said conveyor and extending into the slots in said conveyor bars whereby to slice the individual mushrooms as they are passed thereunder.

8. A machine for slicing mushrooms in planes substantially parallel to the stem axes thereof, comprising a conveyor, means for individually supporting mushrooms on said conveyor, water flotation means for delivering the mushrooms to the supporting means on the conveyor in oriented position with the stem axes disposed at substantially right angles to the direction of movement of the conveyor for slicing, and means including a gang of transversely spaced stationary knives for slicing the mushrooms, said knives being arranged in successively offset relationship with respect to the direction of movement of the conveyor whereby the mushrooms are brought successively into contact with the knives during the slicing operation.

9. A machine for slicing mushrooms in planes substantially parallel to the stem axes thereof, comprising a conveyor having individual pocket means thereon for individually supporting separate mushrooms with their stem axes disposed in vertical planes, a trough through which water constantly flows toward said conveyor for positioning the mushrooms with their stem axes in substantially vertical planes, transfer means consisting of a chute for receiving the properly positioned mushrooms from said trough and water flowing from the trough over the chute to aid in delivering separate mushrooms to the individual pocket means on said conveyor in position for slicing, and a gang of transversely spaced knives adapted to cooperate with the pocket means on said conveyor for slicing the mushrooms as the conveyor is moved.

10. A machine for slicing mushrooms in planes substantially parallel to the stem axes thereof, comprising a conveyor having individual pocket means thereon for individually supporting separate mushrooms with their stem axes disposed in vertical planes, a trough through which water constantly flows toward said conveyor for positioning the mushrooms with their stem axes in substantially vertical planes, transfer means consisting of a chute for receiving the properly positioned mushrooms from said trough and water flowing from the trough over the chute to aid in delivering separate mushrooms to the individual pocket means on said conveyor in position for slicing, a gang of transversely spaced knives adapted to cooperate with the pocket means on said conveyor for slicing the mushrooms as the conveyor is moved, and means for preventing the mushrooms from being dislodged from the pocket means on said conveyor during the slicing operation.

WILLIAM E. CHAMBERS.